US010239205B2

(12) United States Patent
Rusu et al.

(10) Patent No.: US 10,239,205 B2
(45) Date of Patent: Mar. 26, 2019

(54) SYSTEM, METHOD, AND RECORDING MEDIUM FOR CORPUS CURATION FOR ACTION MANIFESTATION FOR COGNITIVE ROBOTS

(71) Applicant: International Business Machines Corporation, Armonk, NY (US)

(72) Inventors: Laura Irina Rusu, Endeavour Hills (AU); Guy Sharon, Bentleigh East (AU); Gandhi Sivakumar, Bentleigh (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 202 days.

(21) Appl. No.: 15/196,148

(22) Filed: Jun. 29, 2016

(65) Prior Publication Data
US 2018/0001470 A1    Jan. 4, 2018

(51) Int. Cl.
*B25J 9/16*     (2006.01)
*G06N 99/00*    (2019.01)
*B25J 11/00*    (2006.01)

(52) U.S. Cl.
CPC ........... *B25J 9/163* (2013.01); *B25J 11/0005* (2013.01); *G06N 99/005* (2013.01); *Y10S 901/03* (2013.01)

(58) Field of Classification Search
CPC ..... B25J 11/0005; B25J 9/163; G06N 99/005; Y10S 901/03
See application file for complete search history.

(56) References Cited

U.S. PATENT DOCUMENTS

| | | | | |
|---|---|---|---|---|
| 6,493,606 B2* | 12/2002 | Saijo | ................. | B25J 13/00 318/568.1 |
| 9,375,845 B1* | 6/2016 | Annan | ................. | B25J 11/0005 |
| 2006/0224546 A1* | 10/2006 | Ballin | .................... | G06F 3/011 706/62 |
| 2007/0192910 A1* | 8/2007 | Vu | .......................... | B25J 5/007 700/245 |
| 2008/0058988 A1* | 3/2008 | Chung | .................. | G06N 3/008 700/258 |
| 2010/0082345 A1* | 4/2010 | Wang | ................... | G06T 13/205 704/260 |
| 2012/0173019 A1* | 7/2012 | Kim | ....................... | B25J 9/1669 700/245 |
| 2013/0115578 A1* | 5/2013 | Shiina | ................. | G09B 21/009 434/112 |
| 2013/0158707 A1* | 6/2013 | Lee | .......................... | G06N 5/02 700/246 |
| 2013/0218339 A1* | 8/2013 | Maisonnier | ......... | B25J 11/0005 700/257 |

(Continued)

OTHER PUBLICATIONS

Monceaux et al "Choregraphe a Graphical Tool for Humanoid Robot Programming", IEEE, Robot and Hunan Interactive Communication, Oct. 2009.*

*Primary Examiner* — Rachid Bendidi
(74) *Attorney, Agent, or Firm* — David Quinn, Esq.; McGinn IP Law Group, PLLC

(57) ABSTRACT

A corpus curation method, system, and non-transitory computer readable medium, include mapping a kinematic motion of a robot to a granular feature of an item in the corpus and answering a user question using the mapped kinematic motion embedded in an answer by the robot.

20 Claims, 5 Drawing Sheets

(56) References Cited

U.S. PATENT DOCUMENTS

| | | | |
|---|---|---|---|
| 2014/0316566 A1* | 10/2014 | Mazel | B25J 9/1671 |
| | | | 700/250 |
| 2015/0100157 A1* | 4/2015 | Houssin | G10L 15/1815 |
| | | | 700/246 |
| 2016/0171303 A1* | 6/2016 | Moore | G06K 9/00671 |
| | | | 382/153 |
| 2017/0113353 A1* | 4/2017 | Monceaux | G10L 13/027 |
| 2017/0148434 A1* | 5/2017 | Monceaux | G10L 15/1815 |

* cited by examiner

SYSTEM, METHOD, AND RECORDING MEDIUM FOR CORPUS CURATION FOR ACTION MANIFESTATION FOR COGNITIVE ROBOTS

BACKGROUND

The present invention relates generally to a corpus curation method for cognitive robots, and more particularly, but not by way of limitation, to a system, method, and recording medium for mapping a corpus to link kinematics for robots to the content of the corpus.

Conventionally, corpus creation for cognitive systems is based on various methods. For example, in topic-oriented cognitive systems, every subsection with topic is broken to the lowest level, processed and tagged, while in context-oriented systems the corpus is "cherry-picked" from the content. Such processed corpus is manifested to the user during interaction. While this may be suitable for user interface-based learning purposes, for Robot-based interactions (e.g., tangible and intangible interfaces) this is not suitable. A Cognitive Robot is expected to portray a number of voluntary and involuntary actions along with the content.

For example, gestures, movements like raising hand, turning head etc. of a robot are not tied to the corpus but arbitrarily selected based on the programmer's intuition and preference to link certain moves to certain sections of the response.

Conventional techniques use inline programming such that each change (i.e., add/update/delete) in non-default animations requires re-tagging of all responses.

That is, there is a technical problem in the conventional techniques in that the gestures, movements, responses of a robot are mapped to individual responses or words such that the robots responses can be limited. In addition, each response needs to be re-mapped based on a change for one type of movement to a word, which can result in hundreds of thousands of changes.

SUMMARY

Thus, the inventors have realized a non-abstract technical solution to the technical problem to provide significantly more than the conventional technique by simulating human behavior when talking/describing events, objects, actions etc. and aligning with the corpus content broken down to features and values thereof portrayed by the robots during interaction. That is, as the kinematics are based on fine-grained features (and values thereof) of the corpus in the technical solution, the robot's behavior will be consistent across applications without a need to re-map each response of the user and instead change one mapped feature (i.e., a "round" object will be described with the same moves no matter the domain based on the mapped feature instead of having to re-map every response with a round object to give a new kinematic motion). Therefore, the technical solution provides an offline corpus such that new or modified tags can be picked up at the processing of the kinematic motion delivery.

In an exemplary embodiment, the present invention can provide a corpus curation method including a corpus, the method including mapping a kinematic motion of a robot to a granular feature of an item in the corpus and answering a user question using the mapped kinematic motion embedded in an answer by the robot.

Further, in another exemplary embodiment, the present invention can provide a non-transitory computer-readable recording medium recording a corpus curation program including a corpus, the program causing a computer to perform: mapping a kinematic motion of a robot to a granular feature of an item in the corpus and answering a user question using the mapped kinematic motion embedded in an answer by the robot.

Even further, in another exemplary embodiment, the present invention can provide a corpus curation system, said system including a corpus; a processor; and a memory, the memory storing instructions to cause the processor to: mapping a kinematic motion of a robot to a granular feature of an item in the corpus and answering a user question using the mapped kinematic motion embedded in an answer by the robot.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

Figure 1:
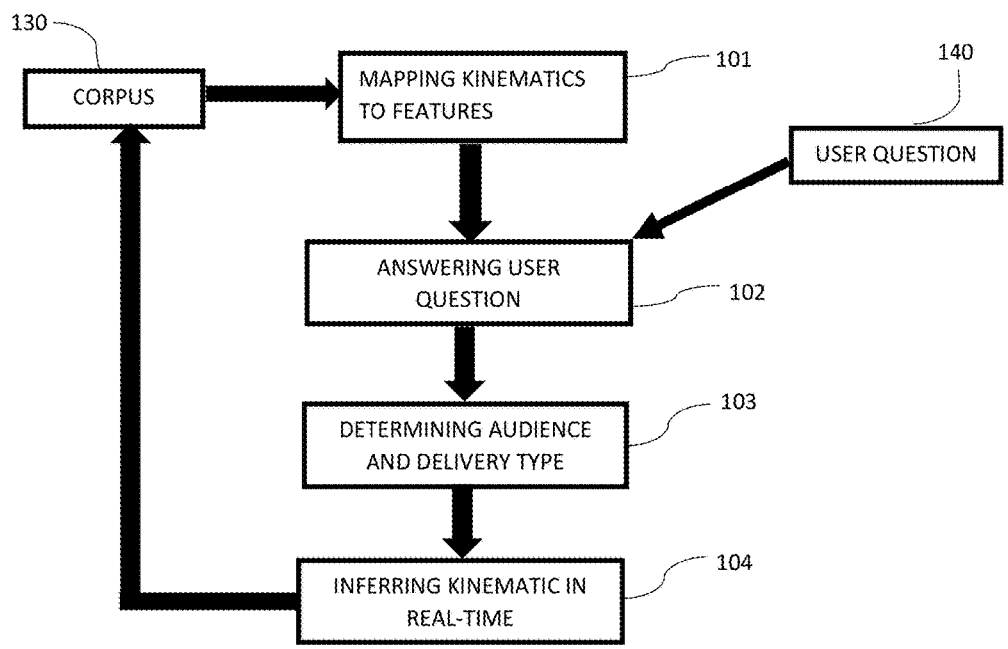
FIG. 1 exemplarily shows a high level flow chart for a corpus curation method 100.

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the corpus curation method 100 includes various steps to map kinematic motions of a robot to a granular feature of a corpus such that kinematic motions for features can be re-mapped easily. Moreover, the method (system) can benefit from "learning" to infer kinematic motions of related features if a feature is not mapped to a kinematic motion (e.g., "rain" and "umbrella"). As shown in at least FIG. 4, one or more computers of a computer system 12 can include a memory 28 having instructions stored in a storage system to perform the steps of FIG. 1.

With the use of these various steps and instructions, the corpus curation method 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Figure 3:
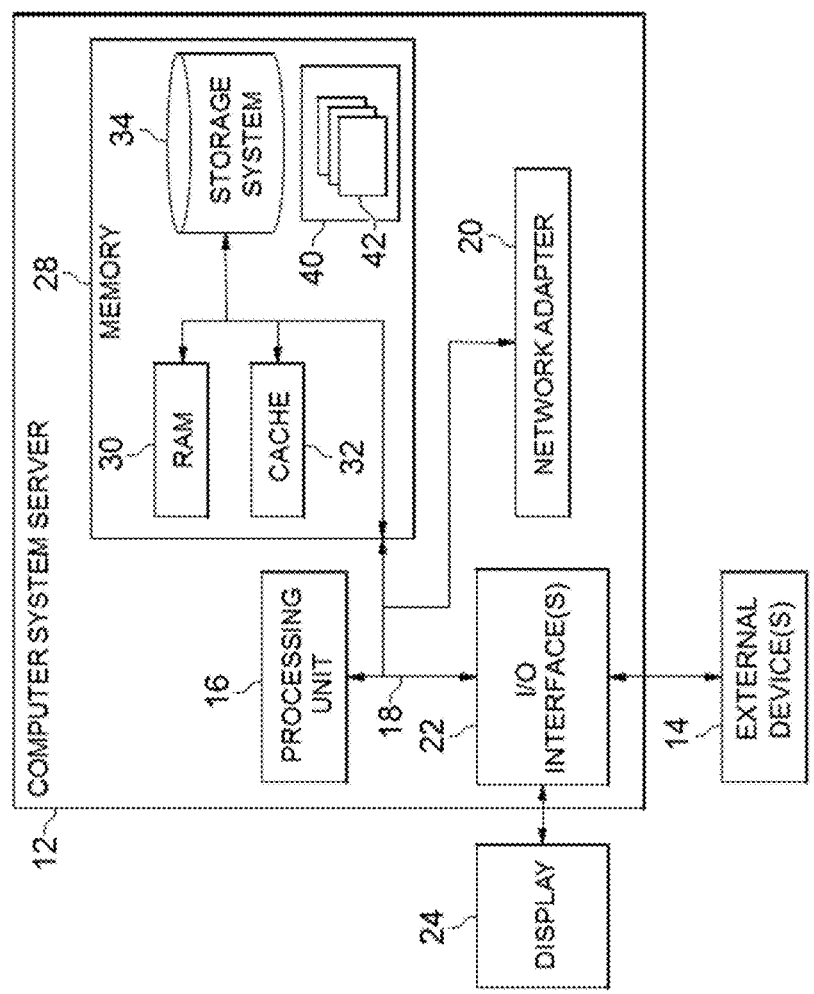
FIG. 3 depicts a cloud-computing node according to an embodiment of the present invention.
Figure 4:
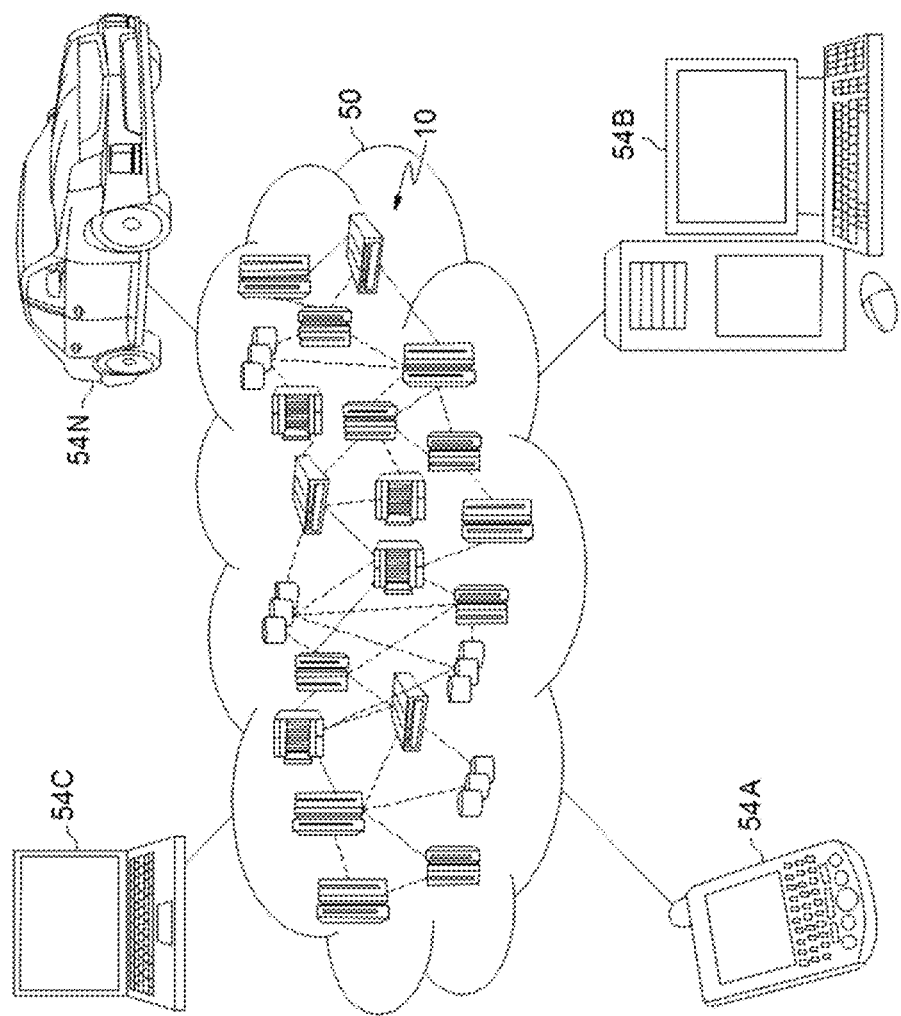
FIG. 4 depicts a cloud-computing environment according to another embodiment of the present invention.
Figure 5:
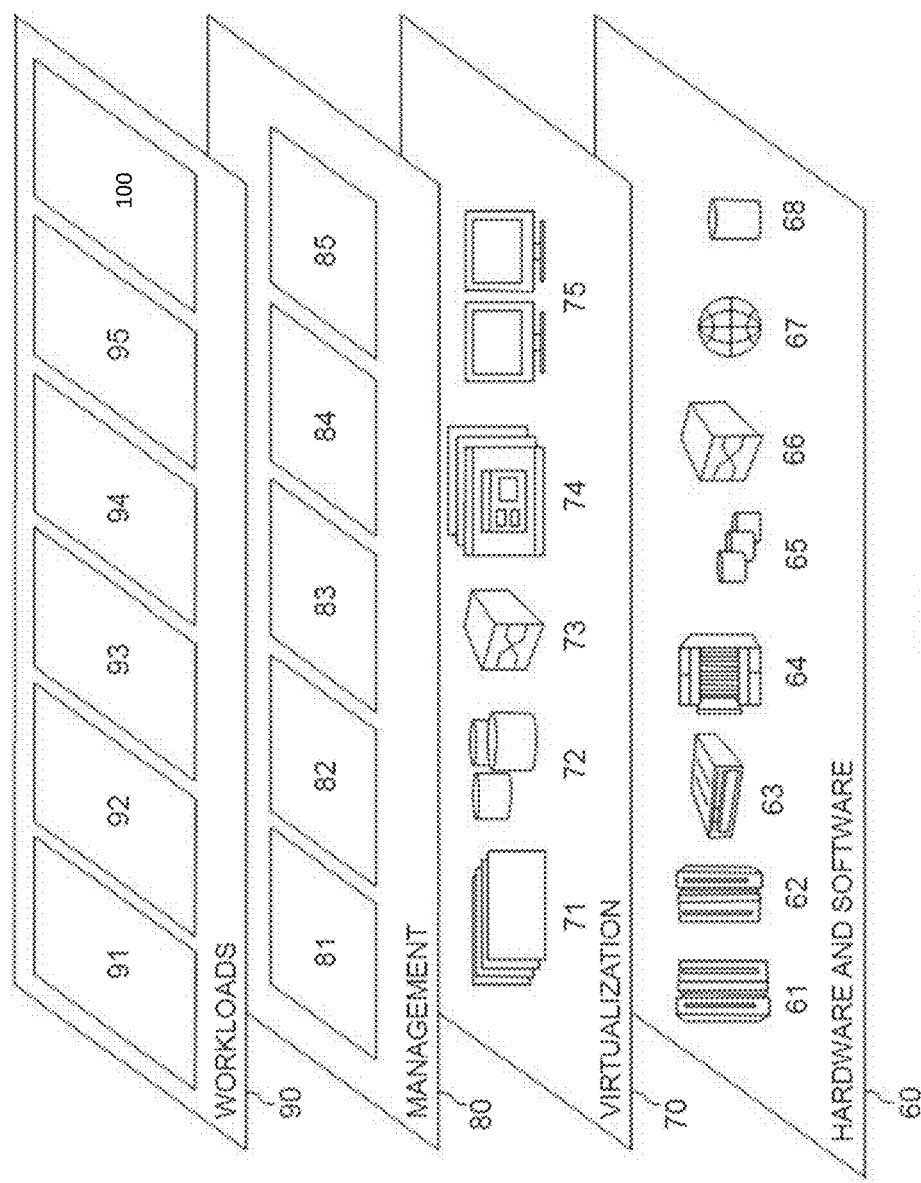
FIG. 5 depicts abstraction model layers according to an embodiment of the present invention.

Although as shown in FIGS. 3-5 and as described later, the computer system/server 12 is exemplarily shown in cloud computing node 10 as a general-purpose computing circuit which may execute in a layer the corpus curation system method (FIG. 4), it is noted that the present invention can be implemented outside of the cloud environment.

It is noted that a cognitive robots (hereafter "robots") are defined as tangible interfaces possessing, for example, the following capabilities: [1]. Cognition embodiment e.g., the ability to be intelligent and interact in a natural way with humans; [2]. Cognition amplification e.g., the ability to become a part of the human community intellectually as well as physical manifestation wise; and [3]. Cognitive elements may be physically co-located or spread across and collectively define cognition embodiment and amplification.

Step 101 maps kinematic motions of a robot response to a corpus 130. More specifically, the corpus 130 includes an item 130a that may be a word or a set of words (e.g., a sentence). The item 130a includes a number of features 130b (e.g., a feature of the items at the lowest granular level at which the feature cannot be broken down further). For example, the item "sun" has features of at least shape (round), color (yellow), and position (up) whereas, the item "lemon" has features of color (yellow) and taste (sour), and whereas the item tree has a feature of height (tall), and the item of book has a feature of shape (square). That is, each feature of the items has a value.

The kinematic motions 130c of the robot are also described at the lowest granular level of motions. For example, the following kinematic motions (K(N)) can be mapped to values of features:

K1=raise both hands at 30 degrees
K2="draw" a circle with the hands
K3="draw" a square with the hands
K4=move head so face is at 80 degrees
K5=move head so face is at −80 degrees
K6=raise arms at 45 degrees
K7=turn eyes towards hands
K8="draw" a heart shape with the hands
K9=hands overlapped in front of the chest Each feature and value of the feature is mapped to a kinematic motion by Step 101.

For example, Step 101 maps the following:
Shape=round→K1+K2
Shape=square→K1+K3
Position=up→K4
Position=down→K5
Size=tall→K6+K8

Further, Step 101 can map letters, words or sentences to specific kinematics, e.g. moves that represent words/expressions in sign language for hearing-impaired people. For example, if Step 103 (as described later) determines the delivery type is the robot and the target audience is not hearing impaired, "love" could be mapped to K1+K8. Alternatively, if the delivery type is the robot and the target audience is hearing impaired, "love" can be mapped to K9.

Step 102 answers a user question 140 based on the mapped kinematic features of Step 101. For example, an answer of "the sun is very bright today" can be answered by Step 102 as "The sun . . . K4+K1+K2 (e.g., kinematic motions mapped to round and up) . . . is very bright today. Or, an answer of "Yesterday he found a book in the tree" can be answered by Step 102 as "Yesterday he found a book . . . K1+K3 (e.g., kinematic motions mapped to square) . . . in the tree . . . K6+K8 (e.g., kinematic motions mapped to tall).

Thereby, even if the answer to the question is not programmed "inline" with kinematic motion, based on Step 101 mapping kinematic motions to values of features of items in the answer offline, the robot can more accurately provide kinematic motions with unmapped answers. Also, if the user wants to change the kinematic motion for "round" from "K1+K2" to just "K2" (e.g., only draw a circle), each answer does not need to be re-mapped and Step 101 only needs to map the kinematic motion "K2" to the feature of shape having a value of round and all subsequent answers including a word having the feature of shape with a value of round will answer in Step 102 with a "K2" motion instead of "K1+K2" motions. This is a major benefit of the invention in which subsequent programming and processing is relatively easy and efficient.

Figure 2:
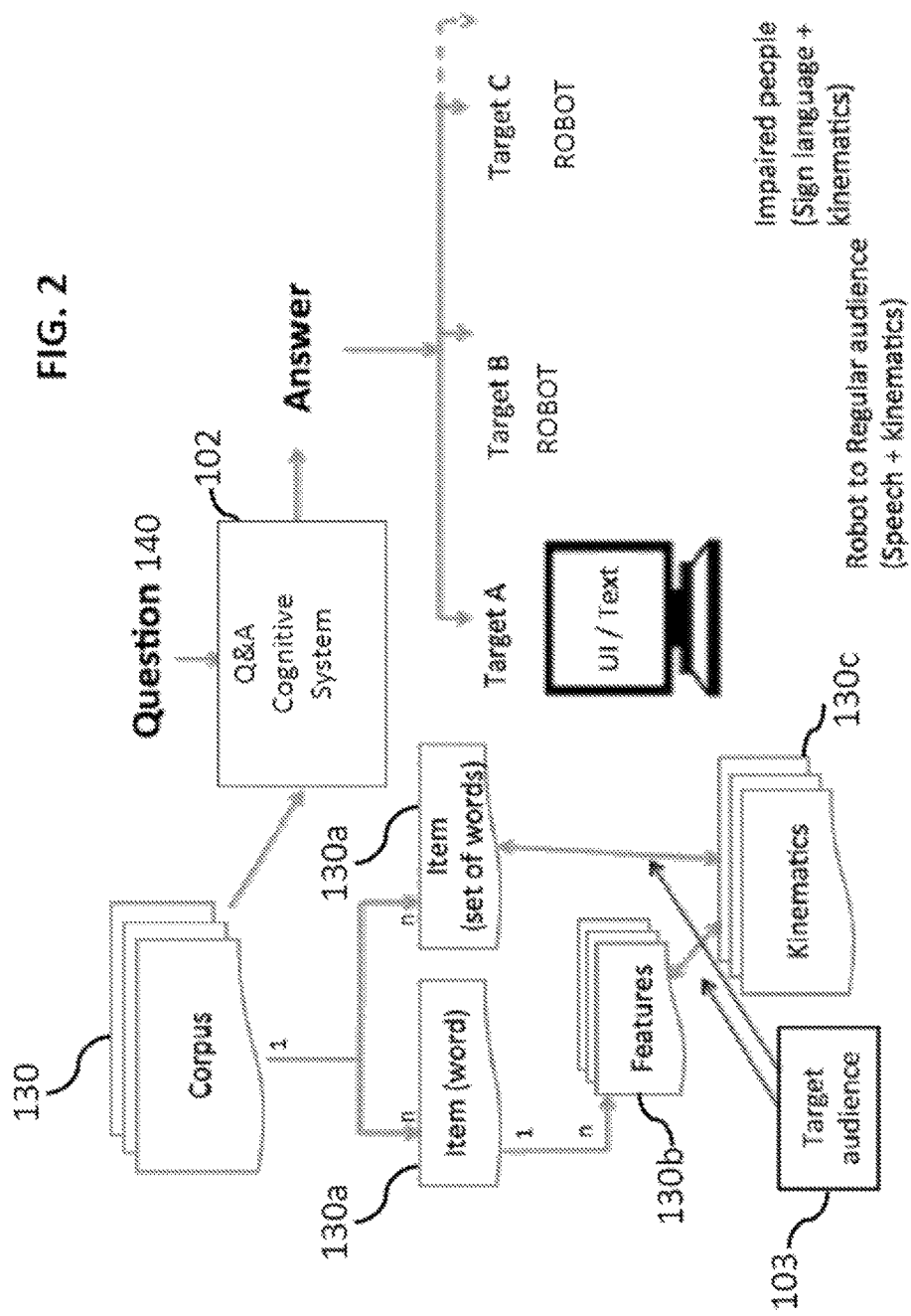
FIG. 2 exemplarily shows an exemplary working embodiment of the corpus curation method 100.

Step 103 determines the audience of the user and delivery type for the answer in order to improve a type of answer. That is, answers are then delivered based on the delivery type and target audience. For example, the possible delivery types could be a display interface for text output or a robot capable of a kinematic motion and a speech output and possible target audience could include blind, hearing-impaired, non-impaired, etc. As shown in FIG. 2, if Step 103 determines the delivery type as a "text interface" (Target A), the answer is delivered as text, if Step 103 determines the delivery type as a robot capable of a kinematic motion and a speech output and the target audience is not-impaired (Target C), the answer can be delivered as speech, corpus-based kinematics, and inferred kinematics. If Step 103 determines the delivery type of a robot capable of a kinematic motion and a speech output but the target audience is determined as being hearing impaired (Target B), answers can be delivered as sign language kinematics with corpus-based kinematics and inferred kinematics (e.g., no speech).

Also, if a new item appears in the answer that is not mapped to a kinematic motion in the corpus, Step 104 infers kinematic mapping in real-time based on the item having a value of a feature linked (or similar to) a mapped item. For example, if there is no kinematic mapping for "rain" but "umbrella" is mapped as K6 and then K10 of "moving fingers". Because umbrella can have a feature of "rain protection", Step 104 can infer that if an answer includes "rain" that the kinematic mapping for "umbrella" can be used for "rain".

Alternatively, Step 104 can determine that "rain" is linked to "umbrella" (e.g., from an inbuilt ontology) and infer a kinematic motion (e.g., robot imitating a raised hand holding an umbrella) even if the word "umbrella" is not mentioned as such in the answer.

On the other hand, Step 104 can detect a sentiment from the answer (i.e. from current response or from longer/entire conversation) and use it to infer the "happy" or "sad" face/gesture/kinematic (some people like rain, others get sad . . . ), without actually mapping the word "rain" to any of the emotions.

Further, Step 104 can use data mining (e.g., association rules) to inferred relationships from the entire corpus, e.g., "thunder" is related to "fear" in most stories, and that can be used as a base to infer a fear gesture when "thunder" is mentioned in an answer but no specific sentiment cannot be extracted from the conversation.

Thereby, Step 104 updates the mapped kinematics in the corpus 130 such that the method 100 "learns" from prior mapping.

Even further, Step 104 can modify the velocity of a mapped kinematic motion by inferring a velocity from context of the corpus. For example, if the answer is "I walked towards the tree", the kinematic motions can be at a first speed and if the answer is "I ran towards the tree", the kinematic motions can be at a second speed faster than the first (e.g., running is faster than walking).

Exemplary Hardware Aspects, Using a Cloud Computing Environment

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 3, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the anti-counterfeiting system 100 and the anti-counterfeiting system 600 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A corpus curation method including a corpus, the method comprising:
   mapping, via a processor, a kinematic motion of a robot to a granular feature of an item in the corpus to create an offline database of the kinematic motion mapped to the granular feature of the item or of a kinematic motion mapped to a combination of two granular features of the item; and
   answering, via the processor, a user question using the mapped kinematic motion in the offline database embedded in an answer by the robot,
   wherein the granular feature of the item in the corpus comprises a feature at a lowest granular level at which the feature cannot be broken down further,
   wherein a delivery type of the answer by the robot includes at least one of:
      a textual display interface for a text output;
      a kinematic motion output by the robot; and
      a speech output by the robot, and
   wherein an audience type comprises any of:
      a blind user;
      a hearing-impaired user; and
      a non-impaired user; and
   the method further comprising determining the audience type and the delivery capability and causing the robot to change the answer based on the delivery capability and the audience type,
   wherein, if the determining determines the audience type as the hearing-impaired user, the answering only causes the robot to deliver the answer with the kinematic motion, and
   wherein, if the determining determines the audience type as the blind user, the answering only causes the robot to deliver the answer with a speech output.

2. The method of claim 1, wherein the granular feature comprises a value of a feature of the item in the corpus.

3. The method of claim 1, wherein the mapping maps a plurality of kinematic motions to the granular feature.

4. The method of claim 1, wherein the kinematic motion comprises a visual representation of a value of the granular feature such that the robot performs the kinematic motion during the answering as the visual representation of the item in the answer.

5. The method of claim 1, further comprising determining an audience type of the answer and a delivery capability of the robot and causing the answering to change a context of the answer according to the audience and the delivery capability.

6. The method of claim 1, further comprising inferring the kinematic motion of a mapped item to a related item in the corpus when the related item is not mapped by the mapping such that answering causes the robot to perform the kinematic motion of the mapped item for the related item.

7. The method of claim 6, wherein the inferring determines when the related item is related to the granular feature of a mapped item by an inbuilt ontology in the corpus.

8. The method of claim 6, wherein the inferring uses an association rule by data mining the corpus to infer the related item to a mapped item.

9. The method of claim 1, further comprising inferring a velocity of the kinematic motion performed by the robot based on a velocity feature indicating a speed of the granular feature of the item in the corpus.

10. The method of claim 1, wherein, if the audience type is determined as the non-impaired user, the answering answers with any one of the textual display interface for the text output, the kinematic motion output by the robot, and the speech output by the robot.

11. The method of claim 1, wherein, if the audience type is determined as the non-impaired user, the answering answers with a combination of the textual display interface for the text output, the kinematic motion output by the robot, and the speech output by the robot.

12. The method of claim 1, wherein, if the audience type is determined as the non-impaired user, the answering answers with all of the textual display interface for the text output, the kinematic motion output by the robot, and the speech output by the robot.

13. The method of claim 1, wherein, if the audience type is determined as the non-impaired user, the answering answers with at least two of the textual display interface for the text output, the kinematic motion output by the robot, and the speech output by the robot.

14. A non-transitory computer-readable recording medium recording a corpus curation program including a corpus, the program causing a computer to perform:
mapping a kinematic motion of a robot to a granular feature of an item in the corpus to create an offline database of the kinematic motion mapped to the granular feature of the item or of a kinematic motion mapped to a combination of two granular features of the item; and
answering a user question using the mapped kinematic motion in the offline database embedded in an answer by the robot,
wherein the granular feature of the item in the corpus comprises a feature at a lowest granular level at which the feature cannot be broken down further,
wherein a delivery type of the answer by the robot includes at least one of:
a textual display interface for a text output;
a kinematic motion output by the robot; and
a speech output by the robot, and
wherein an audience type comprises any of:
a blind user;
a hearing-impaired user; and
a non-impaired user, and
further comprising determining the audience type and the deliver capability and causing the robot to change the answer based on the delivery capability and the audience type,
wherein, if the determining determines the audience type as the hearing-impaired user, the answering only causes the robot to deliver the answer with the kinematic motion, and
wherein if the determining determines the audience type as the blind user, the answering only causes the robot to deliver the answer with a speech output.

15. The non-transitory computer-readable recording medium of claim 14, wherein the granular feature comprises a value of a feature of the item in the corpus.

16. The non-transitory computer-readable recording medium of claim 14, wherein the mapping maps a plurality of kinematic motions to the granular feature.

17. The non-transitory computer-readable recording medium of claim 14, wherein the kinematic motion comprises a visual representation of a value of the granular feature such that the robot performs the kinematic motion during the answering as the visual representation of the item in the answer.

18. The non-transitory computer-readable recording medium of claim 14, further comprising determining an audience type of the answer and a delivery capability of the robot and causing the answering to change a context of the answer according to the audience and the delivery capability.

19. The non-transitory computer-readable recording medium of claim 14, further comprising inferring the kinematic motion of a mapped item to a related item in the corpus when the related item is not mapped by the mapping such that the answering causes the robot to perform the kinematic motion of the mapped item for the related item.

20. A corpus curation system, said system comprising:
a corpus;
a processor; and
a memory, the memory storing instructions to cause the processor to:
map a kinematic motion of a robot to a granular feature of an item in the corpus to create an offline database of the kinematic motion mapped to the granular feature of the item or of a kinematic motion mapped to a combination of two granular features of the item; and
answer a user question using the mapped kinematic motion in the offline database embedded in an answer by the robot,
wherein the granular feature of the item in the corpus comprises a feature at a lowest granular level at which the feature cannot be broken down further,
wherein a delivery type of the answer by the robot includes at least one of:
a textual display interface for a text output;
a kinematic motion output by the robot; and
a speech output by the robot, and
wherein an audience type comprises any of:
a blind user;
a hearing-impaired user; and
a non-impaired user, and
the memory further storing instructions to cause the processor to determine the audience type and the delivery capability and causing the robot to chance the answer based on the delivery capability and the audience type,
wherein, if the audience type is determined as the hearing-impaired user, the answering only causes the robot to deliver the answer with the kinematic motion, and
wherein, if the audience type is determined as the blind user, the answering only causes the robot to deliver the answer with a speech output.

\* \* \* \* \*